US008890774B2

(12) United States Patent
Uphill et al.

(10) Patent No.: US 8,890,774 B2
(45) Date of Patent: Nov. 18, 2014

(54) HEADS-UP DISPLAY FOR A GAMING ENVIRONMENT

(75) Inventors: Stephen Uphill, Horsham (GB);
Christopher Francis, Brighton (GB);
Dominic Jackson, Brighton (GB);
James Whittamore, Brighton (GB);
Ashleigh J. Pook, Hastings (GB)

(73) Assignee: Disney Enterprises, Inc., Burbank, CA (US)

( * ) Notice: Subject to any disclaimer, the term of this patent is extended or adjusted under 35 U.S.C. 154(b) by 766 days.

(21) Appl. No.: 12/868,512

(22) Filed: Aug. 25, 2010

(65) Prior Publication Data
US 2011/0193773 A1 Aug. 11, 2011

Related U.S. Application Data

(60) Provisional application No. 61/302,928, filed on Feb. 9, 2010.

(51) Int. Cl.
| G09G 5/00 | (2006.01) |
| G03H 1/00 | (2006.01) |
| G02B 27/22 | (2006.01) |
| G02B 27/14 | (2006.01) |
| H04N 7/00 | (2011.01) |
| G01C 21/00 | (2006.01) |
| G05D 1/06 | (2006.01) |
| G06F 7/00 | (2006.01) |
| A63F 13/00 | (2014.01) |
| G06F 3/048 | (2013.01) |
| G06K 9/00 | (2006.01) |
| A63F 13/40 | (2014.01) |

(52) U.S. Cl.
CPC .............. *G09G 5/00* (2013.01); *G09G 2340/14* (2013.01); *A63F 2300/8017* (2013.01); *A63F 2300/305* (2013.01); *A63F 13/10* (2013.01)

USPC .................. 345/8; 345/9; 345/633; 359/630; 359/13; 359/466; 348/115; 348/E13.036; 348/E13.023; 340/980; 701/6; 382/103; 382/107; 715/764; 463/3; 463/32; 463/4; 463/5; 463/6; 463/7

(58) Field of Classification Search
CPC .. G02B 27/0101; G02B 27/017; G09G 3/003; G09G 5/00; G09G 2340/14; A63H 18/005; A63F 9/14; A63F 13/10; A63F 2300/305; A63F 2300/8017
USPC ............ 345/7–9, 633; 463/6, 59–60, 3–7, 32; 359/630, 13, 466; 382/103, 107; 348/115, E13.036, E13.023; 340/980; 715/764
See application file for complete search history.

(56) References Cited

U.S. PATENT DOCUMENTS

| 5,415,549 | A | * | 5/1995 | Logg .............................. 434/38 |
| 5,577,960 | A | * | 11/1996 | Sasaki ............................. 463/32 |
| 7,694,885 | B1 | * | 4/2010 | Bourdev ...................... 235/487 |
| 2003/0127557 | A1 | * | 7/2003 | Anderson et al. ............. 244/1 R |
| 2004/0164897 | A1 | * | 8/2004 | Treadwell et al. ............ 342/358 |
| 2006/0276241 | A1 | * | 12/2006 | Toyohara et al. ................. 463/4 |

(Continued)

Primary Examiner — Dwayne Bost
Assistant Examiner — Nalini Mummalaneni
(74) Attorney, Agent, or Firm — Patterson + Sheridan, LLP

(57) ABSTRACT

A heads-up display associated with a user manipulated object in a gaming environment, particularly a racing game. According to one aspect the heads-up display may reduce the distance a user's eye travels between a focal area and the heads-up display.

24 Claims, 11 Drawing Sheets

(56) References Cited

U.S. PATENT DOCUMENTS

| | | | |
|---|---|---|---|
| 2007/0117635 A1* | 5/2007 | Spanton et al. | 463/43 |
| 2008/0096623 A1* | 4/2008 | Fujii et al. | 463/6 |
| 2010/0292886 A1* | 11/2010 | Szczerba et al. | 701/29 |

* cited by examiner

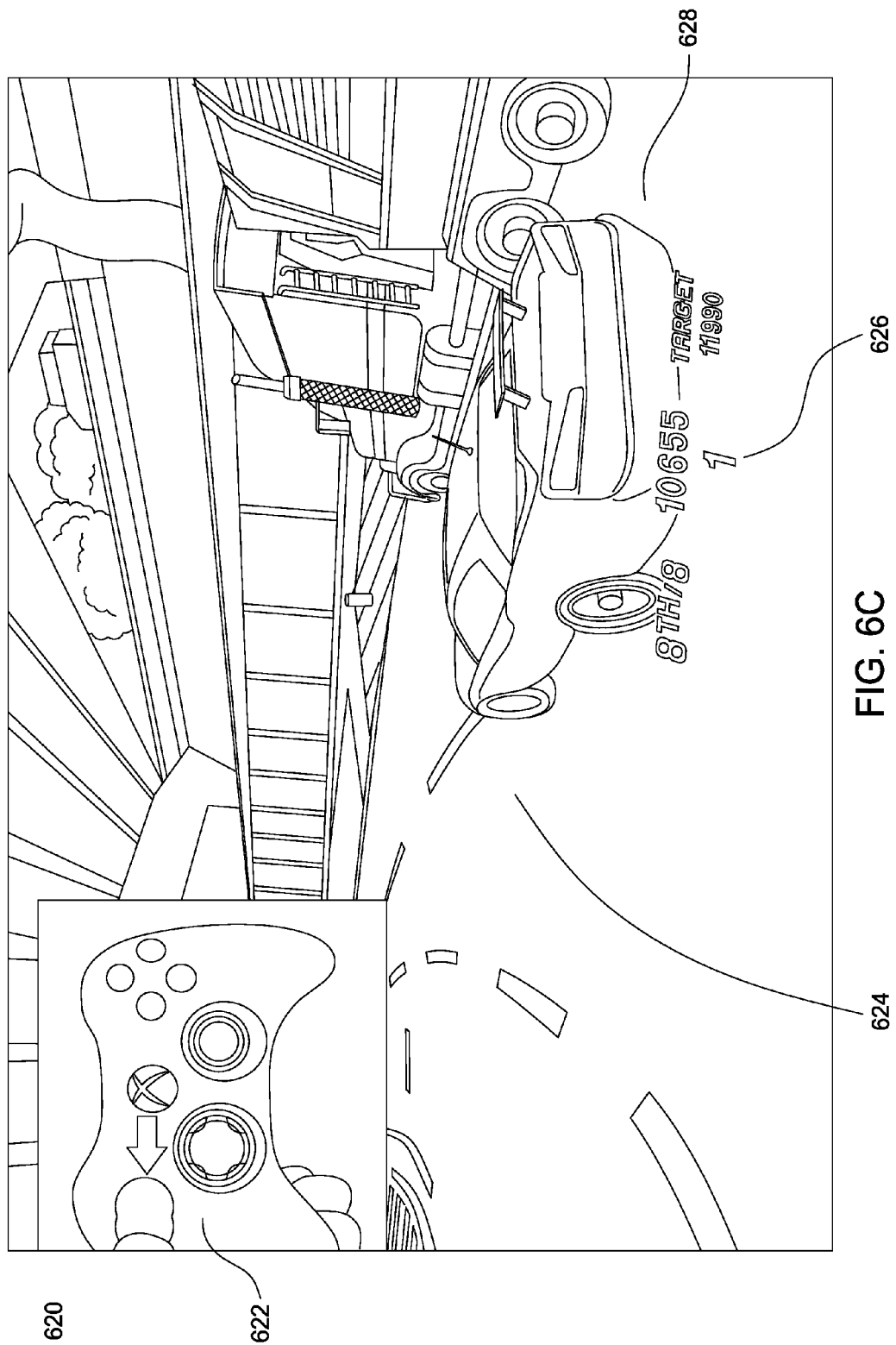

HEADS-UP DISPLAY FOR A GAMING ENVIRONMENT

CROSS-REFERENCE TO RELATED APPLICATIONS

This application claims benefit of U.S. provisional patent application Ser. No. 61/302,928, filed Feb. 9, 2010, which is herein incorporated by reference in its entirety.

BACKGROUND

1. Field

The invention is directed to computer games, and in particular to computer-based games including a heads-up display.

2. Description of the Related Art

Racing games are a popular genre in the computer gaming world. These games typically include one or more players that race on a predefined track. The players either race against a clock (e.g., in the case of a single player race) or against each other (e.g. in the case of a multiplayer race). The players are represented by a virtual vehicle which they control using an input device, such as a steering wheel or joystick-type controller. Each player is typically presented (via the game screen) with a plurality of on-screen graphical objects or text that provide various kinds of information relevant to the race. For example, the game screen may include on-screen graphical objects such as a speedometer, a leader board, a lap counter, a map, etc. Players are often given the option of selecting a perspective (e.g., a view) for viewing the game. One common view is a rearview (or chase view) in which the vehicle is seen from behind is common. In this view, the on-screen objects or text are typically placed in the corners of the screen to avoid cluttering the player's view of the vehicle or the oncoming imagery, while avoiding overloading any given area of the screen. To make use of the various on-screen objects and text, the player must balance their ability to control the vehicle while scanning the screen for the relevant object or text.

SUMMARY

One embodiment of the invention provides a method and system for displaying graphical elements in a computerized virtual game environment. The method and system include outputting a graphical user object for display in a screen representing the virtual game environment, the graphical user object representing a user and being configured to be moved in the virtual game environment by input from the user. The method and system further include outputting a graphical element proximate to the graphical user object and positionally connected to the graphical user object in the screen, so that the graphical element moves within the screen according to the movement of the graphical user object within the screen, wherein the a graphical element represents at least one of gaming metrics and user-selectable gaming options which, when selected by the user, affects at least one aspect of gameplay. Additionally, the method and system include moving the graphical user object in response to input from the user, whereby the graphical element moves correspondingly with the graphical user object.

Another embodiment of the invention provides a method and computer-readable storage medium for displaying functional user affected variables in a racing game display. The method and computer-readable storage medium include providing a computer game having (i) a user-manipulated object in a virtual environment; and (ii) a set of user-controlled variables that affect the action of the user-manipulated object in the virtual environment. The method and computer-readable storage medium also include displaying the object on the racing game display. Additionally, the method and computer-readable storage medium include displaying the user-controlled variables on the racing game display as a set of graphical representations in the proximity of the object such that the user-controlled variables are attached to the object.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 6A-6F are exemplary screenshots of virtual cars with and without heads-up displays, according to embodiments of the invention.

DETAILED DESCRIPTION

Figure 1:
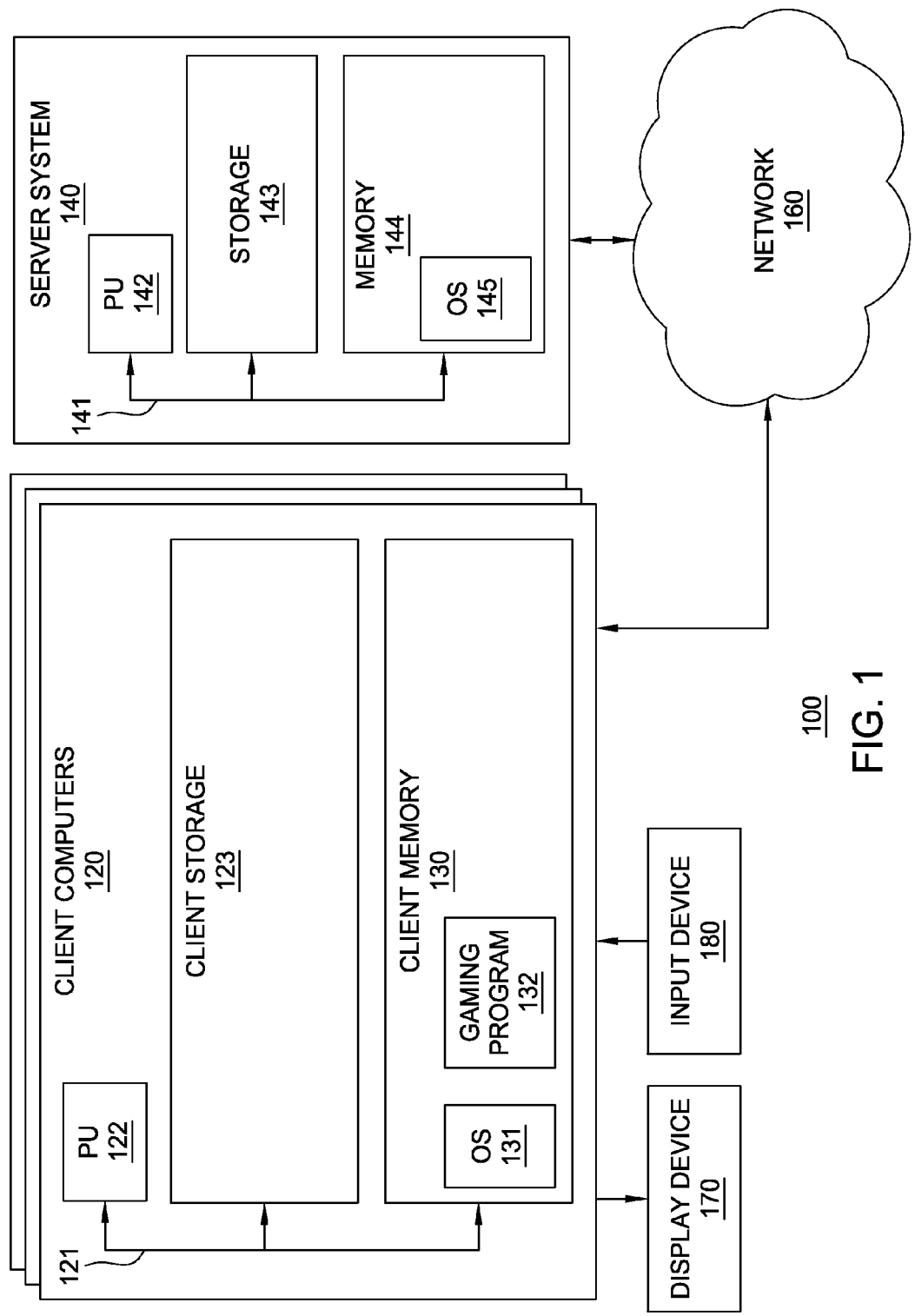
FIG. 1 is a block diagram illustrating a client-server view of a computing environment, according to one embodiment of the invention.

Embodiments of the present invention are directed to a heads-up display. Particular embodiments provide a heads-up display (also referred to herein as a "HUD") in a computerized racing game. The heads-up display is generally positionally "tethered" to the user's vehicle. That is, the heads-up display may appear as an attribute or extension of the vehicle itself, rather than as a fixed screen element (e.g., in a corner of the screen). In one aspect, the heads-up display may be configured (e.g., positioned and/or dimensioned) to mitigate the user's eye movement from a focal area, where the focal area defines the general screen area in front of the vehicle that the user focuses on to direct the movement of the vehicle during a race.

The following embodiments of the invention are described with reference to a vehicle racing game in which a plurality of game characters compete to win a race around a course. The game characters may be player controlled and/or computer controlled. However, it will be apparent to those skilled in the art that the invention is not limited to implementation in a racing game but may be implemented in games of any format in which a heads-up display (HUD), or equivalent thereof, is used.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a block diagram illustrates a client-server view of a computing environment 100, according to one embodiment of the invention. As shown, computing environment 100 includes client computers 120, a network 160, and a server system 140. In one embodiment, the environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented differently, regardless of whether the computer systems are complex multi-user computing systems, such as a cluster of individual computers connected by a high-speed network, single-user workstations, or network appliances lacking non-volatile storage. Further, while FIG. 1 illustrates a client-server model, other models are contemplated such as a peer-to-peer model.

As shown, each client computer 120 includes a processing unit 122, which obtains instructions and data via a bus 121 from a client memory 130 and client storage 123. Processing unit 122 is a programmable logic device that performs instruction, logic, and mathematical processing, and may be representative of one or more CPUs and/or GPUs. Client storage 123 stores application programs and data for use by client computer 120. The memory 130 is any memory sufficiently large to hold the necessary programs and data structures. Memory 130 could be one or a combination of memory devices, including Random Access Memory, nonvolatile or backup memory (e.g., programmable or Flash memories, read-only memories, etc.). In addition, memory 130 and storage 123 may be considered to include memory physically located elsewhere; for example, on another computer coupled to the client computer 120 via bus 121.

Client storage 123 includes hard-disk drives, flash memory devices, optical media and the like. Client computer 120 is operably connected to the network 160. Client memory 130 includes an operating system (OS) 131 and a gaming program 132. Operating system 131 is the software used for managing the operation of the client computer 120. Examples of OS 131 include UNIX, a version of the Microsoft Windows® operating system, and distributions of the Linux® operating system. (Note: Linux is a trademark of Linus Torvalds in the United States and other countries.)

In one embodiment, each client is a dedicated gaming console, such as a Sony PS3® or Nintendo Xbox 360®, capable of executing the gaming program 132. In another embodiment, each client is a general purpose computer configured to run any variety of gaming and non-gaming software. The game may be viewed on a display device 170, such as an LCD, LED or CRT monitor display, and controlled using input devices 180 which may be, e.g., a keyboard, mouse and/or a controller.

As shown, the server system 140 includes the same basic hardware elements as the client computers 120. Specifically, the server system 140 includes a processing unit 142 (representative of one or more CPUs and/or GPUs), a memory 144 and storage 143 connected via a bus 141. The server system 140 may be operably connected to the network 160, which generally represents any kind of data communications network. Accordingly, the network 160 may represent both local and wide area networks, including the Internet. In one embodiment, the server system 140 hosts an on-line gaming environment to which one or more of the client computers 120 connect. In this case, server-side gaming software may be located on the server system 140 and cooperates with client-side gaming software (e.g., game program 132) located on the respective client computers 120.

It is specifically contemplated that embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a game program) or related data available in the cloud. For example, the racing game described herein could execute on a computing system in the cloud, thereby allowing a user to access the game from any computing system attached to a network connected to the cloud (e.g., the Internet).

Figure 2:
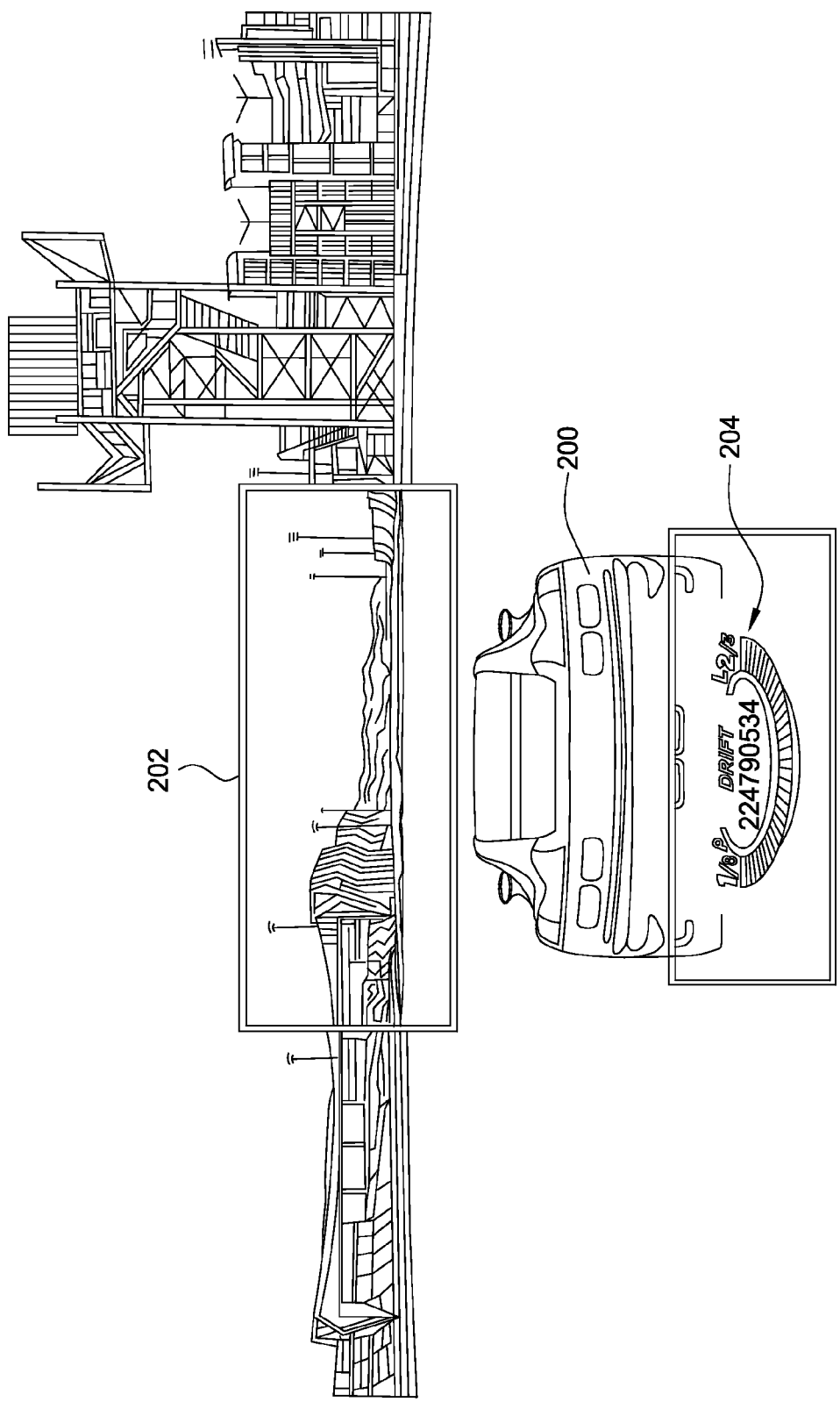
FIG. 2 is an exemplary screenshot of a virtual car with a heads-up display, according to one embodiment of the invention.

In one embodiment, the game software (e.g., game program 132), wherever located, is a racing game in which one or more users control a vehicle. Referring now to FIG. 2, a rear view of a car 200 is shown on a screen. The car is presumed to be moving into the plane of the page. Accordingly, a user's focus may predominately be contained within a relatively small area in the center of the screen. This area is referred to herein as the focal area 202 and is represented by a rectangle over the roof and hood of the car. It should be noted that the rectangle representing the focal area is merely shown for purposes of illustration and is not an actual screen object seen by the user playing the game. It is contemplated that the size of the rectangle may be a function of the speed of the car. The higher the speed of the car, the smaller the focal area. In other words, with increasing speed the user's focus may be increasingly constrained (although not necessarily linearly) to a smaller area. Whatever the particular size/shape of the focal area and its relation to change in speed, the focal area represents that portion of the screen where the user tends to focus when the car is traveling at sufficiently high speeds. As such, the focal area generally encompasses the car's trajectory.

In one embodiment, one or more graphical elements of a heads-up display 204 are positioned in the screen in a manner that mitigates the distance the user's eye must travel from the focal area to the heads-up display. The heads-up display is generally positionally "tethered" to the car so that the heads-up display appears as an attribute of the car or extension of the car itself, rather than as a fixed screen element (e.g., in a corner of the screen). For example, FIG. 2 shows an embodiment in which a heads-up display is located behind the car. More specifically, the heads-up display is shown extending from the rear bumper of the car. However, in another embodiment, the heads-up display may be located elsewhere, or even defined by one or more elements that are positioned on various surfaces of the car. For example, the heads-up display may be positioned on the rear bumper itself. Further, the heads-up display may be an overlay or maybe an integral component of the car, such as where the heads-up display is incorporated into a banner on the rear bumper of the car. It is also contemplated that the heads-up display may be superimposed on the image of the car on the screen by the provision of head-mounted gear (e.g., goggles) that the user wears.

In one embodiment, the heads-up display shown in FIG. 2 is a rigid object that that maintains a fixed relationship with the rear bumper. In another embodiment, the heads-up display is given the effect of a projection onto the road surface, such that the display undulates with the changing topography of the road surface. For example, in one embodiment of the invention, the display may dynamically change to reflect the terrain of the road surface. The display may also change to reflect events in the gaming world. For example, the display may shift in various ways when a user-controlled vehicle makes a turn in a racing game. As a second example, the display may shake in response to an explosion in the gaming world.

The heads-up display conveys various information to the user during gameplay. For example, the heads-up display shown in FIG. 2 includes a power bar, player position and a lap counter. In one embodiment, sections of the power bar are illuminated as the user performs certain actions or achieves certain objectives. The player position indicates the position of the player with respect to the other cars in the race, while the lap counter indicates how many laps are left in the race. It is contemplated that the heads-up display may display other information (e.g., fuel, mileage, etc.) in other embodiments.

In one aspect, the provision of the heads-up display according to embodiments of the invention mitigates the user's eye movement between the focal area and the heads-up display. Further, the heads-up display of the present invention frees up additional real estate on the screen, according to at least one embodiment. Thus, embodiments of the invention allow for optimal placement of the heads-up display such that the user may quickly take in the information displayed on the heads-up display, while the majority of the screen remains free for displaying aspects of the gaming world.

While aspects of the invention are described with respect to a car in a racing game, these descriptions are merely illustrative and not limiting. For example, the car 200 and the heads-up display 204 of FIG. 2 are merely particular instantiations of what can more generally be described as a user manipulated object and an associated set of user controlled variables, respectively. For example, in another embodiment, the user manipulated object is an avatar. Of course, one of ordinary skill in the art will recognize that other types of games may be used with embodiments of the invention, and that generally any game with a heads-up display capable of performing the functions described herein may be used.

Figure 3:
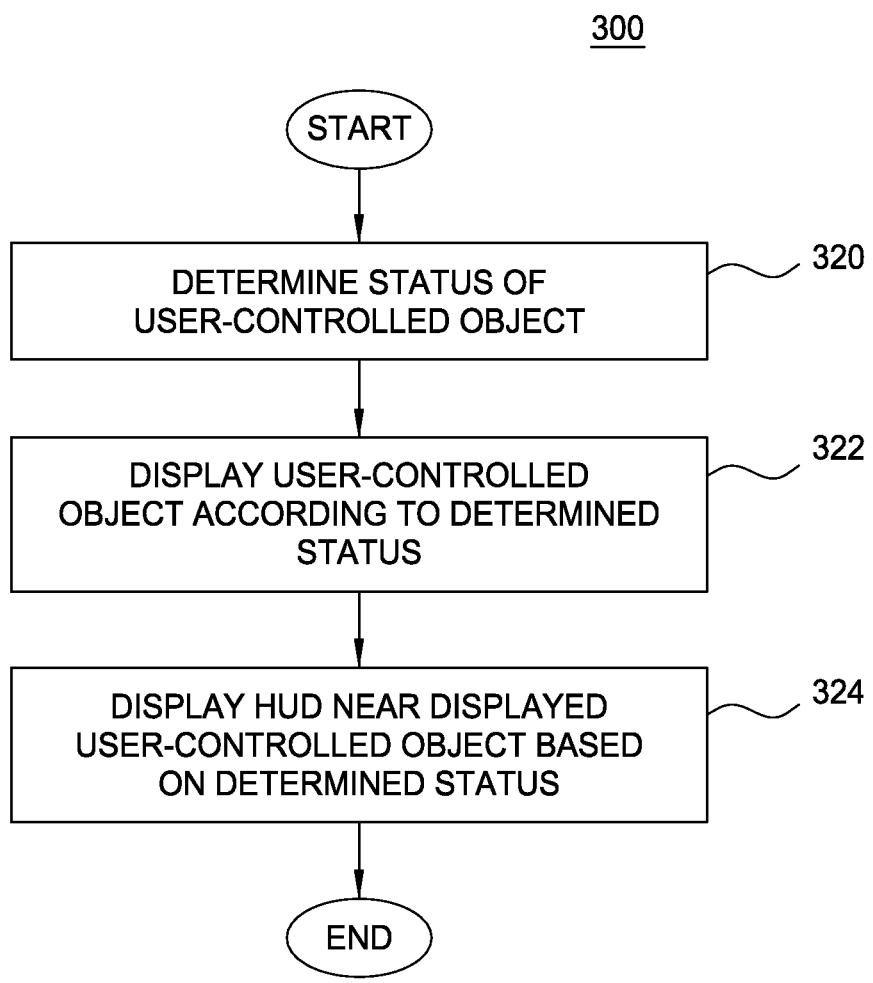
FIG. 3 is a flow diagram illustrating a method of displaying a heads-up display, according to one embodiment of the invention.

FIG. 3 is a flow diagram illustrating a method of displaying a heads-up display, according to one embodiment of the invention. As shown, the method 300 begins at step 320, where the gaming program 132 determines the status of a user-controlled object. The determined status may generally include information about the gaming world and the user-controlled object in the gaming world. For example, in an embodiment where the gaming program 132 is a racing game, the determined status may include information on the speed of the user-controlled object, the trajectory of the user-controlled object, the incline of the terrain in the gaming world. Additionally, the determined status may also include gameplay attributes relating to the user-controlled object. Illustratively, such information may include the user's current lap of a race, the user's current position in the race (e.g., position 7 out of 8 cars in the race), a point total for the user, and a current tachometer value for the user-controlled object (e.g., 6500 RPM). Of course, the above examples are for illustrative purposes only, and one of ordinary skill in the art will recognize that other information about the user-controlled object and the gaming world, as well as other related information, may also be determined.

Once the current status of the user-controlled object in the gaming world is determined, the gaming program 132 then outputs the user-controlled object for display based on the determined status (step 322). For example, the gaming program 132 may output the user-controlled object to reflect information such as the current speed of the user-controlled object, the incline of the surface, and the trajectory of the user-controlled object. Once the user-controlled object is output for display, the gaming program 132 then outputs the HUD for display in proximity to the displayed user-controlled object, based on the determined status (step 324). Additionally, the gaming program 132 may output the HUD for display such that the displayed HUD is also in proximity to the user's focal area. The displayed HUD may include all or part of the information that was determined above in step 320. For example, the HUD may display the current speed of the user-controlled object, the user's current lap of the race, the user's current position in the race, etc. Additionally, the HUD may display this information literally (e.g., 6500 RPM), or may reflect the information graphically (e.g., a bar graph representing RPMs). In one embodiment, the HUD may display particular information only when a certain event occurs in the game. For example, the HUD may display the word "DRIFT" only when the user-controlled vehicle is drifting in the gaming world.

One advantage of the method 300 is that the HUD contains relevant information for the user playing the game and is located such that the user may easily view the information. That is, because the HUD is displayed in close proximity to the user-controlled object and in or near the user's focal area on the screen, the user will not need to look away from the user-controlled object in order to see the information. As such, by using the method 300, the user may concentrate on playing the game and controlling the user-controlled object, but is still informed of the relevant information.

Figure 4:
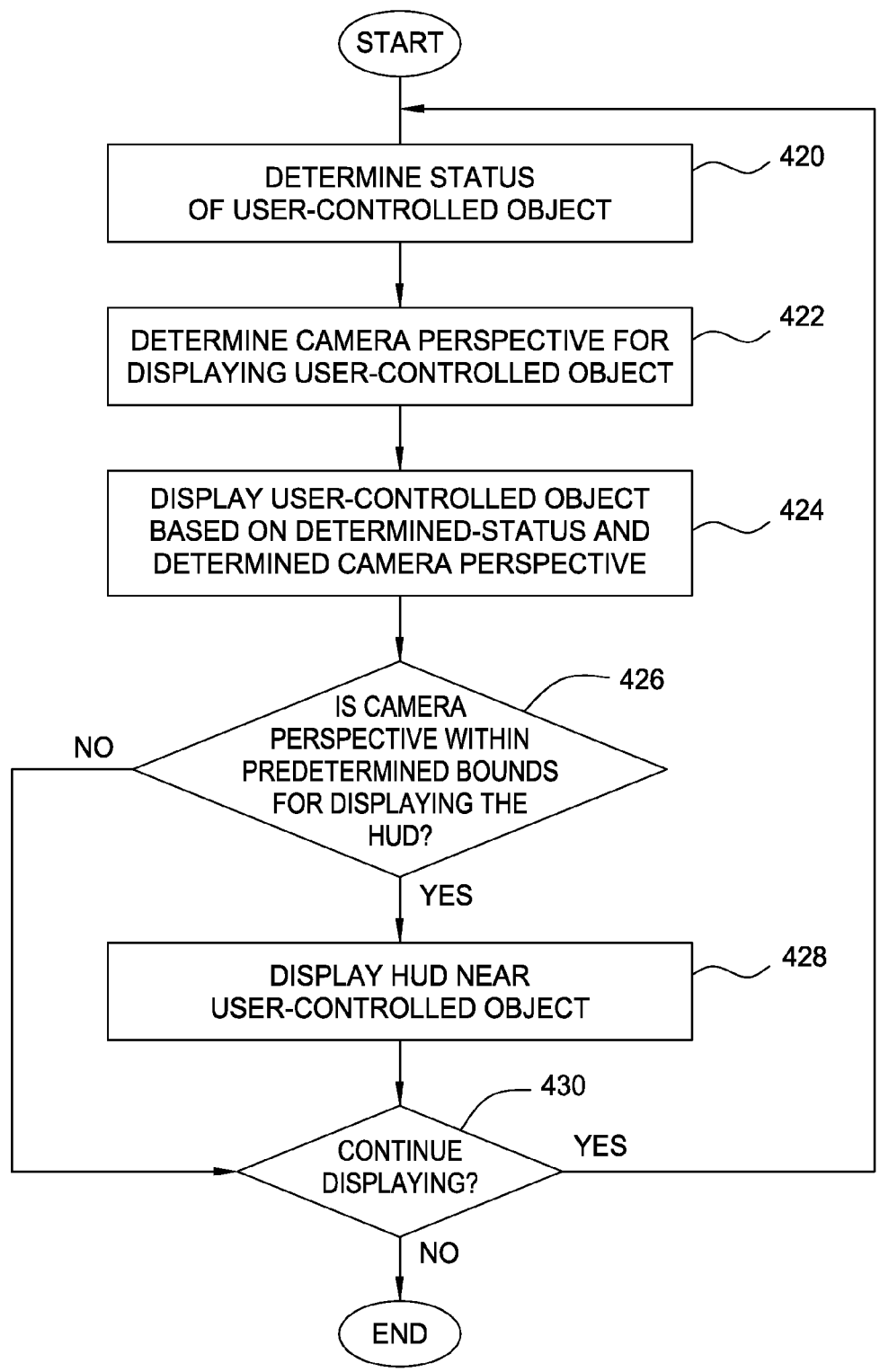
FIG. 4 is a flow diagram illustrating a method of displaying a heads-up display, according to one embodiment of the invention.

FIG. 4 is a flow diagram illustrating a method of displaying a heads-up display, according to one embodiment of the invention. As shown, the method 400 begins at step 420, where the gaming program 132 determines the status of a user-controlled object. As discussed above, the status generally includes information about the gaming world and the user-controlled object in the gaming world. The gaming program 132 then determines the camera perspective to use in displaying the user-controlled object (step 422). For example, the gaming program 132 may determine that the current camera angle is from the rear of the user-controlled object. As a second example, the gaming program 132 may instead determine the current camera angle is from the front of the user-controlled object. In one embodiment, the determined camera perspective is used both displaying the user-controlled object and for determining whether to display the HUD. For example, in certain embodiments, the gaming program 132 may be configured to display the HUD only when the camera angle is from the rear of the user-controlled object, since it is more likely that the user is playing the game when viewing the car from the rear (and thus may benefit from seeing the displayed information), as opposed to a side view or front view of the car, which is more likely for aesthetic purposes rather than for gameplay.

Once the status and camera perspective are determined, the gaming program 132 then displays the user-controlled object based on the determined status and the determined camera perspective (step 424). Upon displaying the user-controlled object, the gaming program 132 then determined whether the camera perspective is within a predetermined range for displaying the HUD (step 426). Thus, in the pictured embodiment of the invention, the gaming program 132 is configured to display the HUD only when the camera angle is behind the user-controlled object. Of course, one of ordinary skill in the art will recognize that other camera angles, as well as other factors, may be used to determine whether to display the HUD. Illustratively, the other factors may include, but are not limited to, activation of a certain game mode in the gaming program 132, a particular configuration setting for displaying the HUD, and pressing a particular button or key on a controller. In an alternate embodiment, the gaming program 132 displays the HUD at all times.

Returning to the pictured method 400, if the gaming program 132 determines the camera perspective is within the predetermined range, the gaming program 132 displays the HUD near the user-controlled object (step 428). By displaying the HUD in close proximity to the displayed user-controlled object, the method 400 minimizes the distance the user must look away from the user-controlled object to see information displayed on the HUD. For example, in an embodiment where the gaming program 132 is a racing game and the user-controlled object a car in the racing game, the user will likely focus his attention on the car and the road in the game. As such, by using the method 400 and displaying the HUD in close proximity to the car, the user is able to maintain his focus on the user-controlled car, but is still informed of the information displayed on the HUD. In one embodiment, the HUD is displayed as coupled to the user-controlled object, such that when the user-controlled object moves, the HUD moves accordingly. For example, the HUD may appear as projected onto the pavement behind the rear bumper of the car in a racing game. Furthermore, in one embodiment, the HUD is displayed as a part of the user-controlled object. Thus, continuing the above example, the HUD may be displayed as part of the bumper of the car in the racing game. The above examples are given for illustrative purposes only, and of course, embodiments of the invention may display the HUD in any manner or location capable of performing the functions described herein.

Once the HUD is displayed, or if the gaming program 132 determines the camera angle is not within the predetermined range for displaying the HUD, the gaming program 132 then determines whether it should continue displaying the user-controlled object (step 430). For instance, in an embodiment where the gaming program 132 is a racing game, the gaming program 132 may determine that the user-controlled vehicle should no longer be displayed once a given race is complete. Alternatively, if the race is still in progress, the gaming program 132 may determine that it should continue to display the vehicle. If the gaming program 132 determines it should continue displaying the user-controlled vehicle, the method begins again at step 420, where the gaming program 132 determines an updated status of the user-controlled object. Alternatively, if the gaming program 132 determines it should not continue displaying the user-controlled object, the method 400 ends.

Figure 5:
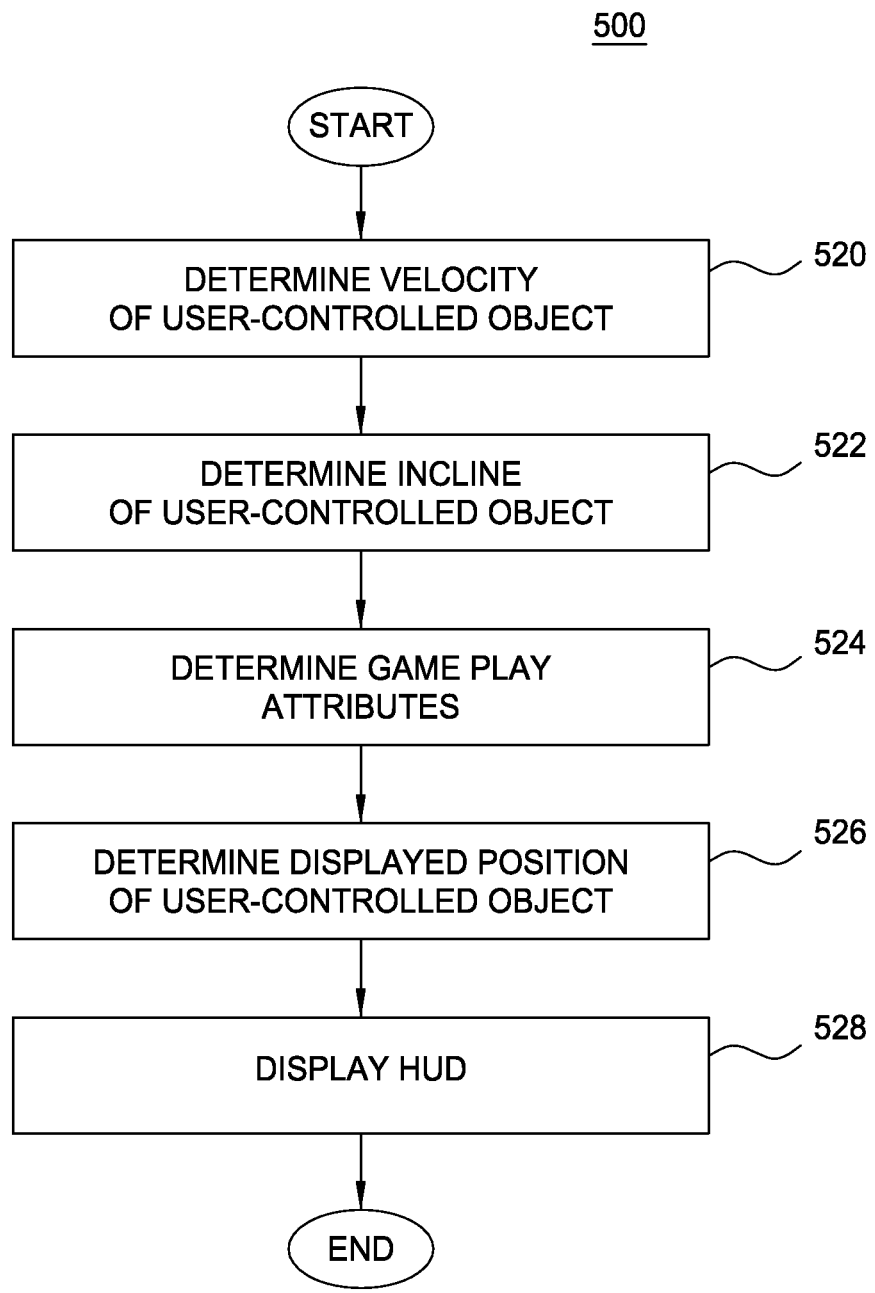
FIG. 5 is a flow diagram illustrating a method of collecting information used to display a heads-up display, according to one embodiment of the invention.

FIG. 5 is a flow diagram illustrating a method of displaying a heads-up display, according to one embodiment of the invention. More specifically, the method 500 shows a method of displaying a heads-up display in a racing game. As shown, the method 500 begins at step 520, where the gaming program 132 determines a current velocity of the user controlled object. In one embodiment of the invention, the gaming program 132 is configured to display the HUD in closer proximity to the user's focal area (e.g., focal area 202) as the determined velocity of the user-controlled object increases. As discussed above, as the speed of the user-controlled object increases, the user's focus may be increasingly constrained to a smaller area of the screen. As such, the gaming program 132 determines the current speed of the user-controlled object for use in displaying the HUD, such that when the gaming program 132 displays the HUD, the HUD will be closer to the user's focal area and thus more easily viewed by the user.

The gaming program 132 then determines a current incline of a virtual surface the user-controlled object is travelling on (step 522). In one embodiment, the gaming program 132 displays the HUD as projected onto the pavement behind the user-controlled vehicle. As such, the gaming program 132 may display the HUD differently based on the incline of the pavement. Thus, for example, if the user-controlled vehicle is travelling uphill, the gaming program may dynamically adjust the displayed HUD to match the incline of the terrain. In one embodiment, the HUD may also take on the texture of the terrain. For example, in a racing game where a user-controlled vehicle is driving on a virtual road, the HUD may take on the texture of the road. Once the incline of the virtual surface is determined, the gaming program 132 determines various gameplay attributes (step 524). Generally, the various gameplay attributes may include any information to be displayed on the HUD. Exemplary gameplay attributes include a current velocity of the user-manipulated object in the virtual environment, a current race position of the user-manipulated object, a current tachometer value, a current lap of a race and a total number of laps in the race. Illustratively, other examples of gameplay attributes include a health value of the user-controlled object, a point total, a number of lives and a power meter.

Additionally, the gaming program 132 determines the current display position of the user-controlled object on the screen (step 526). The gaming program 132 may use the current display position of the user-controlled object to determine where to display the HUD. As noted above, according to embodiments of the invention, the HUD is optimally displayed in proximity to both the user-controlled object and the user's focal area. Upon determining the current displayed position of the user-controlled object, the gaming program 132 displays the HUD in proximity to the determined displayed position of the user-controlled object (step 528). The displayed HUD may include the gameplay attributes determined above in step 524. Additionally, the displayed HUD may reflect the determined incline of the user-controlled object, and may further reflect the determined velocity of the user-controlled object.

Figure 6A:
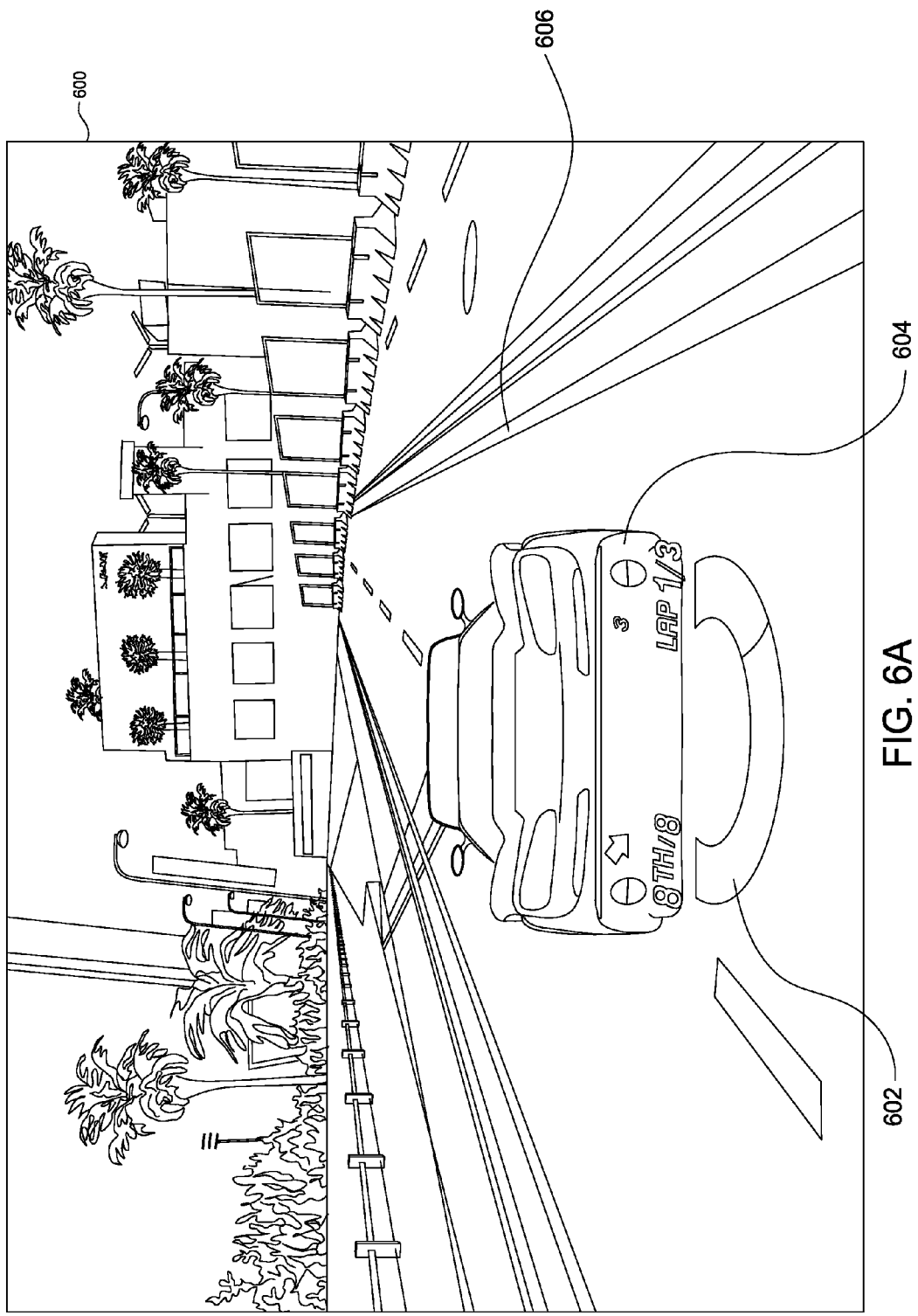

FIGS. 6A-6F are exemplary screenshots of virtual cars with and without heads-up displays, according to embodiments of the invention. FIG. 6A is an exemplary screenshot of a stationary virtual car resting on a flat virtual surface and with a heads-up display, according to one embodiment of the invention. As shown, the screenshot 600 includes a user-controlled vehicle 604 that is currently stationary. The user-controlled vehicle 604 is position on the virtual road 606. Additionally, the screenshot 600 includes a HUD 602, positioned in proximity to the user-controlled vehicle 604. The HUD 602 includes various information, such as the current race position (e.g., $8^{th}/8$), the current lap of the race (e.g., Lap 1/3), Furthermore, in the depicted embodiment, the HUD 602 is displayed as projected onto the virtual surface 606, behind the user-controlled vehicle 604.

Advantageously, the HUD 602 is displayed in close proximity to both the vehicle 604 and the user's focal area, making it easier for the user to view the information on the HUD 602 while still focusing on controlling the vehicle 604. Additionally, because of the relatively small size of the HUD 602, the HUD 602 takes up a minimal amount of space on the screen and allows the user to view more of the gaming world. Furthermore, because of the HUD's 602 position behind the vehicle 604, which may be a relatively uneventful area of the screen, the HUD 602 will not block important parts of the gaming world from the user's view. In other words, by displaying the HUD 602 in close proximity to the vehicle 604, embodiments of the invention help to declutter the display screen and allow the user to see more of the gaming world. Of course, one of ordinary skill in the art will recognize that other information may be displayed on the HUD 602, using various HUD 602 sizes and locations, and that the above examples are given for illustrative purposes only.

Figure 6B:
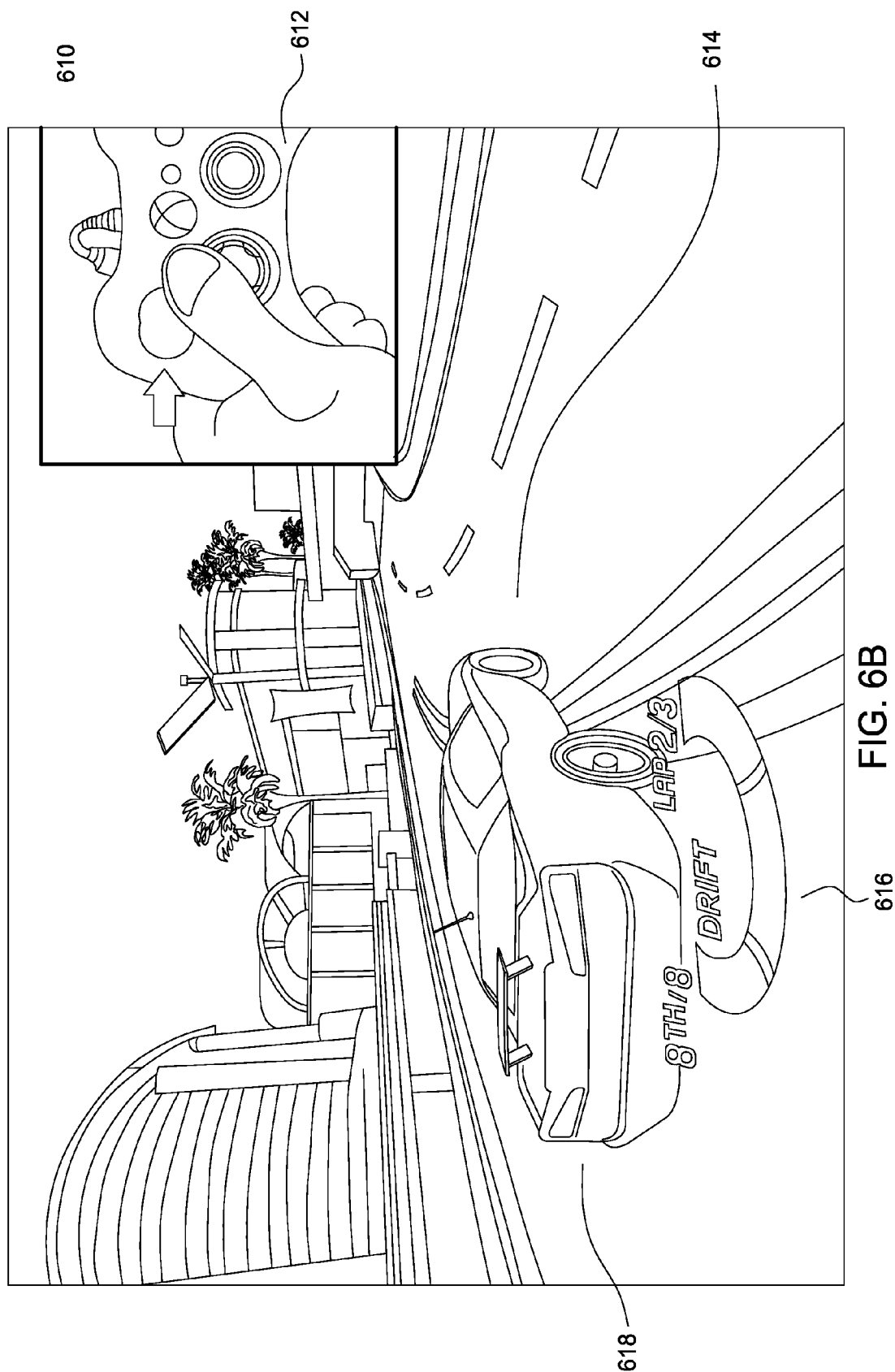

FIG. 6B is an exemplary screenshot of a virtual car making a right turn and with a heads-up display, according to one embodiment of the invention. As shown, the screenshot 610 shows a user-controlled object 618, moving at a high velocity on a virtual surface 614. Furthermore, in the depicted embodiment, the vehicle 618 is making a right turn on the virtual surface 614, responsive to the user moving a joystick on the controller 612 to the right. Additionally, the screenshot 610 also shows a HUD 616, displayed in close proximity to the user-controlled object 618. As shown, the HUD 616 is also dynamically altered responsive to the vehicle's 618 right turn, such that the left side of the HUD 616 is lower than the right side, reflecting the trajectory of the vehicle 618. In other words, the angle of the HUD 616 may be altered in addition to the position of the HUD 616 on the screen.

Advantageously, by dynamically altering the HUD 616 to reflect the trajectory of the car as it makes the right turn, embodiments of the invention add to the appeal of the game, as both the user-controlled object 618 and the HUD 616 reflect the forces of the sharp right turn. Furthermore, in one embodiment of the invention, the camera angle from which the virtual scene is displayed may be altered in response to certain events or actions. Thus, in such an embodiment, although the angle of the HUD 616 itself may be unaltered, the HUD 616 may appear to the user to be at an incline because the HUD 616 is displayed from a different camera angle. Of course, one of ordinary skill in the art will quickly recognize that such actions need not be mutually exclusive, and that any combination of actions may be performed in response to a particular user input. For example, the angle of the HUD 616, the HUD's 616 position on the screen and the camera angle from which the virtual world is viewed may all be adjusted in response to the user input 612 and the depicted vehicle 618 making a right turn.

As discussed above, the pictured HUD 616 also includes various information about the user-controlled object 618 in the gaming world, such as the user's current place in the race (e.g., $8^{th}/8$) and the user's current lap in the race (e.g., Lap 2/3). In one embodiment of the invention, separate parts of the HUD 616 may be configured to move independently of the other parts of the HUD 616. For instance, the various components of the HUD 616 may be configured to be displayed from different angles behind the vehicle 618, such that as the camera angle shifts, the components of the HUD 616 may appear to move independently from one another. As an example, the power bar component of the HUD 616 may be configured to move separately from the race information components shown in the HUD 616 (e.g., the user's current place in the race and the user's current lap in the race).

FIG. 6C is an exemplary screenshot of a virtual car making a left turn and with a heads-up display, according to one embodiment of the invention. Similar to FIG. 6C, the screenshot 620 shows a user-controlled object 628, moving at a high velocity on a virtual surface 624. Furthermore, in the depicted embodiment, the vehicle 628 is making a left turn on the virtual surface 624, responsive to the user moving the joystick on the controller 622 to the left. The screenshot 620 also shows a HUD 626, displayed in close proximity to the user-controlled object 628. As shown, the HUD 626 is also dynamically altered responsive to the vehicle's 628 left turn, such that the left side of the HUD 626 is higher than the right side, reflecting the incline of the vehicle 628. As discussed above, the pictured HUD 626 includes various information about the user-controlled object 628 in the gaming world, such as the user's current place in the race (e.g., $8^{th}/8$), the user's current points (i.e., 10655), the target number of points (e.g., Target 11900), and a point multiplier (e.g., ×1).

Figure 6D:
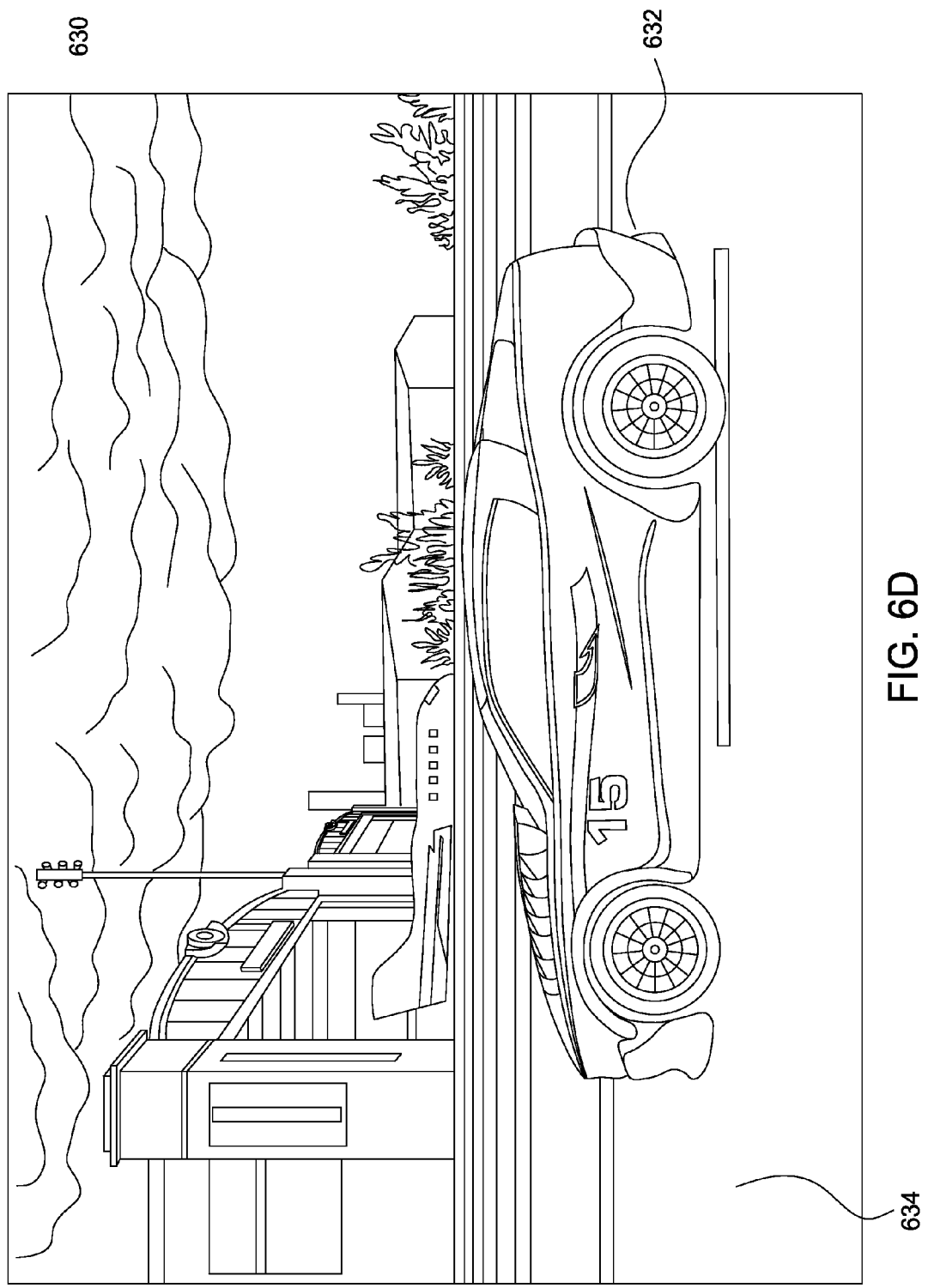

FIG. 6D is an exemplary screenshot of stationary virtual car from a side-angle camera perspective, according to one embodiment of the invention. As shown, the screenshot 630 shows a side perspective of a currently-stationary user-controlled vehicle 632. In the depicted example, the vehicle 632 is resting on a flat surface 634 in the gaming world. As discussed above, the gaming program 132 may be configured to display a HUD only when the camera is showing the user-controlled object 632 from certain angles. In the pictured embodiment, the gaming program 132 is configured to display the HUD only when the camera is viewing the user-controlled object 632 from the rear. As such, because the screenshot 630 is showing a side perspective of the vehicle 632, no HUD is displayed.

This is advantageous because while certain camera angles (e.g., a rear view of the user-controlled object) are commonly used for functional gameplay purposes, such as controlling the vehicle and playing the game, other camera angles (e.g., a side view of the user-controlled object) are commonly used for purely aesthetic purposes, such as viewing the user-controlled object in the gaming world. Thus, because the HUD displays functional information that is useful for gameplay purposes, the user is less likely to need such information in situations where the user merely wishes to view the object in the gaming world for aesthetic purposes. By hiding the HUD when the user-controlled object is viewed from a side perspective, such as is shown in the screenshot 630, the user is able to view more of the gaming world, and the user's view of the gaming world is not obstructed with the display of functional gameplay information.

Figure 6E:
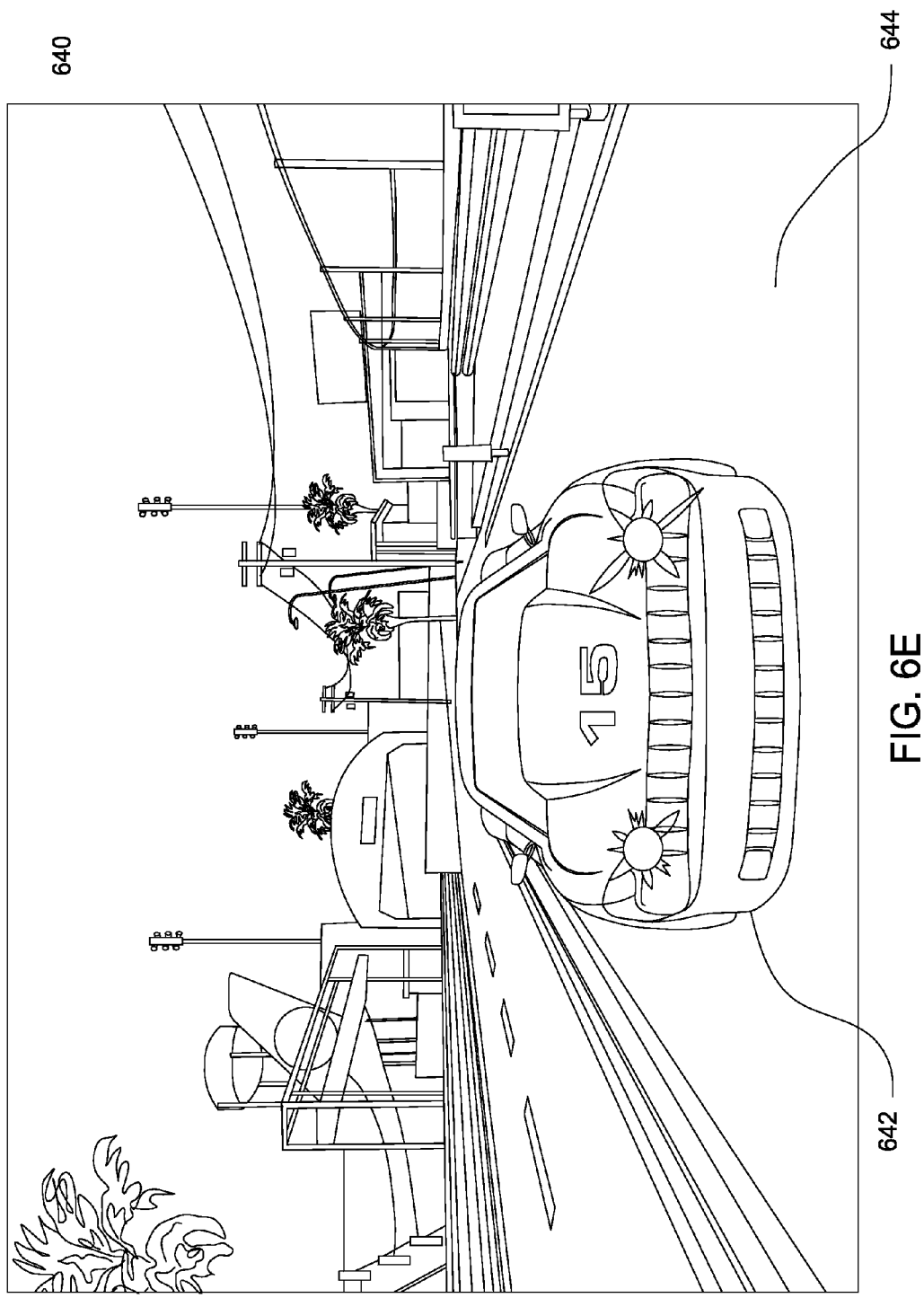

FIG. 6E is an exemplary screenshot of a stationary virtual car from a front-angle camera perspective, according to one embodiment of the invention. Similar to FIG. 6D, the screenshot 640 shows a user-controlled object 642, currently stationary and resting on a virtual surface 644. As shown, the screenshot 640 shows a front perspective of the user-controlled vehicle 642. Additionally, as discussed above, the gaming program 132 may be configured to display a HUD on the screen only when the user-controlled object 642 is viewed from certain camera angles. In the pictured embodiment, the gaming program 132 is configured to display the HUD only when the camera is viewing the user-controlled object 642 from the rear. As such, because the screenshot 630 is showing a front perspective of the vehicle 642, no HUD is displayed.

This is advantageous because, as discussed above, the user may be less concerned with gameplay information when viewing the vehicle 642 from certain camera angles, and as such may not wish the gameplay information to be displayed in those situations. Put another way, if the user is viewing the vehicle 642 from the front, it is unlikely that the user is attempting to control the vehicle 642 in a race from this angle, because the user would be unable to see where the vehicle 642 is going. As such, it is more likely that the user is viewing the vehicle 642 for aesthetic purposes, and thus may prefer the HUD be hidden when viewing the vehicle 642 from the front camera angle.

Figure 6F:
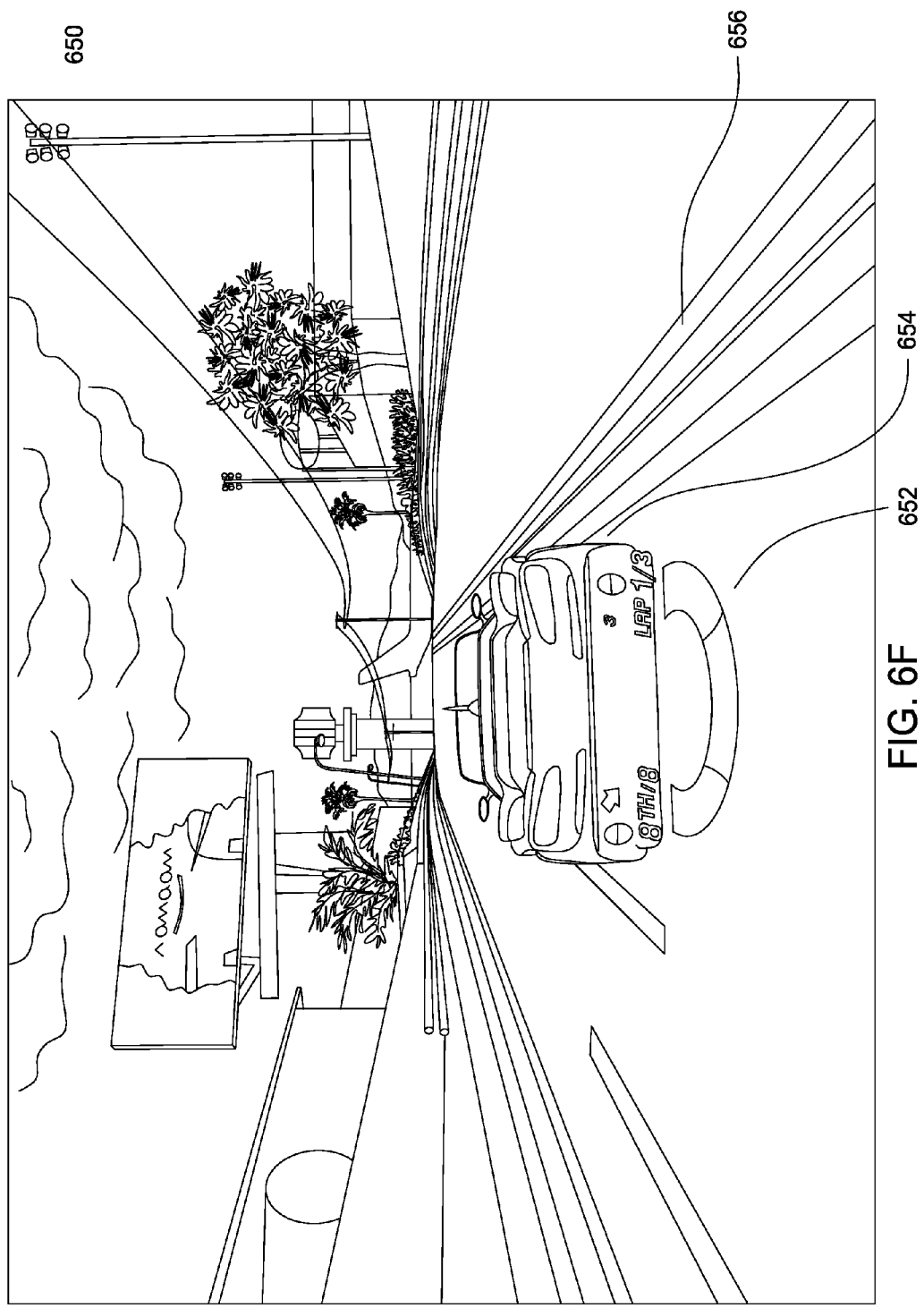

FIG. 6F is an exemplary screenshot of a virtual car on an inclined surface and with a heads-up display, according to one embodiment of the invention. As shown, the screenshot 650 shows a user-controlled vehicle 654 travelling on an inclined virtual surface 656. The screenshot 650 also shows a HUD 652 in close proximity to the user-controlled vehicle 654. In the depicted embodiment, the HUD 652 is dynamically adjusted to reflect both the speed of the vehicle 654 and the inclined surface 656 that the user-controlled vehicle 654 is travelling on. Thus, as shown, the HUD 652 is dynamically adjusted to appear closer to the vehicle 654 and to the user's focal area. It is important to note that, as discussed above, because the vehicle 654 is travelling at a high speed in the screenshot 650, the user's focal area will accordingly be smaller than if the vehicle was travelling at a slower speed (or stationary). By dynamically adjusting the HUD 652 to appear closer to the user's focal area (i.e., the area in front of the vehicle 654, at the center of the screen), the user may more easily view the gameplay information displayed on the HUD 652, without diverting his attention away from the gaming world and the control of the vehicle 654.

While the foregoing is directed to embodiments of the present invention, other and further embodiments of the invention may be devised without departing from the basic scope thereof, and the scope thereof is determined by the claims that follow.

What is claimed is:

1. A computer-implemented method of displaying graphical elements in a virtual game environment, comprising, by operation of one or more computer processors:
   outputting a graphical user object for display in a screen representing the virtual game environment, the graphical user object representing a user and being configured to be moved in the virtual game environment by input from the user;
   outputting a heads-up display graphical element projected onto the graphical user object such that the heads-up display graphical element is displayed as part of the graphical user object, wherein the heads-up display graphical element moves within the screen according to the movement of the graphical user object within the screen, and wherein the heads-up display graphical element represents at least one of gaming metrics and user-selectable gaming options which, when selected by the user, affects at least one aspect of gameplay;
   moving the graphical user object within the screen in response to a directional input from the user; and
   moving the heads-up display graphical element closer to a focal area within the screen as a velocity of the graphical user object increases.

2. The method of claim 1, wherein the gaming metrics comprise at least one of (i) a current speed of the graphical user object, (ii) a current race position of the graphical user object, (iv) a current tachometer value, (iv) a current lap of a race and (v) a total number of laps in the race.

3. The method of claim 1, wherein the gaming metrics comprise at least one of (i) a health value, (ii) a point total, (iii) a point multiplier and (iv) a power meter.

4. The method of claim 1, further comprising:
   responsive to the directional input from the user, modifying a display position of the heads-up display graphical element in the screen by adjusting at least one of (i) a camera angle of the virtual game environment and (ii) a display angle of the heads-up display graphical element.

5. The method of claim 1, further comprising:
   adjusting a position of the heads-up display graphical element within the screen, based on an occurrence of an event within the virtual game environment.

6. The method of claim 1, wherein the heads-up display graphical element is displayed as having the texture of the surface in the virtual environment.

7. The computer-implemented method of claim 1, wherein the focal area comprises at least a portion of the graphical user object.

8. A computer-implemented method of displaying functional user-affected variables in a racing game display, comprising:
   providing a computer game having (i) a user-manipulated object in a virtual environment and (ii) a set of user-controlled variables that reflect a current state of the user-manipulated object in the virtual environment;
   displaying the user-manipulated object on the racing game display;
   displaying the user-controlled variables within a heads-up display graphical element of the racing game display as a set of graphical representations projected onto the user-manipulated object, such that the heads-up display graphical element is displayed as part of the user-manipulated object wherein the heads-up display graphical element moves within the screen according to the movement of the user-manipulated object;
   moving the user-manipulated object within the screen in response to a directional input from the user; and
   adjusting a position of the heads-up display graphical element within the racing game display, wherein the heads-up display graphical element moves closer to a focal area within the racing game display as a velocity of the user-manipulated object increases.

9. The method of claim 8, wherein the user-controlled variables comprise at least one of (i) a current speed of the user-manipulated object in the virtual environment, (ii) a current race position of the user-manipulated object, (iv)a current tachometer value, (iv) a current lap of a race and (v) a total number of laps in the race.

10. The method of claim 8, wherein the user-controlled variables comprise at least one of (i) a health value, (ii) a point total, (iii) a point multiplier and (iv) a power meter.

11. The method of claim 8, wherein adjusting the position of the heads-up display graphical element further comprises:
   in response to directional input from a user, modifying the position of the heads-up display graphical element within the screen by adjusting at least one of (i) a camera angle of the virtual game environment and (ii) a display angle of the heads-up display graphical element.

12. The method of claim 8, wherein adjusting the position of the heads-up display graphical element is further based on an occurrence of an event within the computer game.

13. The method of claim 8, wherein the heads-up display graphical element is displayed as having the texture of the surface in the virtual environment.

14. The computer-implemented method of claim 8, wherein the focal area comprises at least a portion of the user-manipulated object.

15. A system, comprising:
   a computer processor; and
   a memory containing a program that, when executed on the computer processor, performs an operation of displaying graphical elements in a virtual game environment, comprising:
      outputting a graphical user object for display in a screen representing the virtual game environment, the graphical user object representing a user and being configured to be moved in the virtual game environment by input from the user;

outputting a heads-up display graphical element as projected onto the graphical user object, such that the heads-up display graphical element is displayed as part of the graphical user object, wherein the heads-up display graphical element moves within the screen according to the movement of the graphical user object within the screen, wherein the heads-up display graphical element represents at least one of gaming metrics and user-selectable gaming options which, when selected by the user, affects at least one aspect of gameplay;

moving the graphical user object within the screen in response to a directional input from the user; and moving the heads-up display graphical element closer to a focal area within the screen as a velocity of the graphical user object increases.

16. The system of claim 15, wherein the gaming metrics comprise at least one of (i) a current speed of the user-manipulated object in the virtual environment, (ii) a current race position of the user-manipulated object, (iv) a current tachometer value, (iv) a current lap of a race and (v) a total number of laps in the race.

17. The system of claim 15, wherein the gaming metrics comprise at least one of (i) a health value, (ii) a point total, (iii) a point multiplier and (iv) a power meter.

18. The system of claim 15, further comprising:
responsive to the directional input from the user, modifying a display position of the heads-up display in the screen by adjusting at least one of (i) a camera angle of the virtual game environment and (ii) a display angle of the heads-up display graphical element.

19. The system of claim 15, further comprising:
adjusting a position of the heads-up display graphical element within the screen, based on an occurrence of an event within the virtual game environment.

20. The system of claim 15, wherein the heads-up display graphical element is displayed as having the texture of the surface in the virtual environment.

21. The system of claim 15, wherein the focal area comprises at least a portion of the graphical user object.

22. A non-transitory computer-readable medium containing a program that, when executed, performs an operation of displaying functional user-affected variables in a racing game display, comprising:

providing a computer game having (i) a user-manipulated object in a virtual environment and (ii) a set of user-controlled variables that reflect a current state of the user-manipulated object in the virtual environment;

displaying the user-manipulated object on the racing game display;

displaying the user-controlled variables within a heads-up display graphical element of the racing game display as a set of graphical representations projected onto the user-manipulated object, such that the heads-up display graphical element is displayed as part of the user-manipulated object, wherein the heads-up display graphical element moves within the screen according to the movement of the user-manipulated object within the screen, and wherein the heads-up display graphical element represents at least one of gaming metrics and user-selectable gaming options which, when selected by the user, affects at least one aspect of gameplay;

moving the user-manipulated object within the screen in response to a directional input from the user; and adjusting a position of the heads-up display graphical element within the racing game display, wherein the heads-up display graphical element moves closer to a focal area within the racing game display as a velocity of the user-manipulated object increases.

23. The non-transitory computer-readable medium of claim 22, wherein the user-controlled variables are displayed in a predefined viewing region of the racing game display to declutter the racing game display.

24. The non-transitory computer-readable medium of claim 22, wherein the focal area comprises at least a portion of the user-manipulated object.

* * * * *